US006999858B2

(12) United States Patent
Walker et al.

(10) Patent No.: US 6,999,858 B2
(45) Date of Patent: Feb. 14, 2006

(54) METHOD AND APPARATUS FOR DETECTING THE REMOVAL OF A VEHICLE ANTENNA AND SUBSEQUENTLY AUTHENTICATING THE USER

(75) Inventors: Glenn A. Walker, Greentown, IN (US); Christopher A. Hedges, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 279 days.

(21) Appl. No.: 10/686,454

(22) Filed: Oct. 15, 2003

(65) Prior Publication Data

US 2005/0085951 A1 Apr. 21, 2005

(51) Int. Cl.
*G05D 1/00* (2006.01)

(52) U.S. Cl. ............................ 701/1; 701/36; 701/213; 342/357.07; 340/426.1

(58) Field of Classification Search .................... 701/1, 701/23, 36, 213, 214, 208; 342/357.07–357.19; 340/426.1, 426.11, 426.13; 180/287
See application file for complete search history.

(56) References Cited

U.S. PATENT DOCUMENTS 6,611,229 B1 * 8/2003 Muramatsu et al. ... 342/357.07
6,717,508 B1 * 4/2004 Sashida ..................... 340/5.72
6,741,187 B1 * 5/2004 Flick .......................... 340/989
6,744,403 B1 * 6/2004 Milnes et al. .......... 342/357.07
6,784,809 B1 * 8/2004 Flick .......................... 340/989
6,831,597 B1 * 12/2004 Sasaki et al. .......... 342/357.07

* cited by examiner

*Primary Examiner*—Richard M. Camby
(74) *Attorney, Agent, or Firm*—Stefan V. Chmielewski

(57) ABSTRACT

A vehicle security apparatus for preventing unauthorized use of a vehicle includes an antenna communicating with at least one remote device. Detection circuitry detects damage to and/or removal of the antenna. An operator authentication device determines whether a operator has authorization to operate the vehicle. A shutdown device at least partially disables the vehicle if the detection circuitry detects the damage to and/or removal of the antenna, and if the operator authentication device determines that the operator does not have authorization to operate the vehicle.

21 Claims, 7 Drawing Sheets

METHOD AND APPARATUS FOR DETECTING THE REMOVAL OF A VEHICLE ANTENNA AND SUBSEQUENTLY AUTHENTICATING THE USER

TECHNICAL BACKGROUND

This invention relates generally to security systems for commercial vehicles, and, more particularly, to security systems including an automatic vehicle location system.

BACKGROUND OF THE INVENTION

Vehicular security systems including automatic vehicle location (AVL) products have been developed and are increasingly becoming available for use in assets such as commercial vehicles and trailers. For example, AVL products are currently provided in delivery trucks so that the locations of the trucks can be tracked at a central dispatch office. Tracking of a truck's location is desirable in order to ensure that the driver stays on his designated route, and to detect if the truck has been stolen or hijacked, possibly by a terrorist.

An AVL system includes some sort of global positioning system (GPS) in order to determine the vehicle's location, and even the vehicle's speed, as is well known in the art. An AVL system can include wireless links for receiving satellite signals that are used by the GPS to calculate the vehicle's location, and for transmitting signals specifying the calculated location of the vehicle to a central dispatch or fleet management center where such vehicle locations are tracked. The dispatcher can then determine whether the vehicle is at an appropriate location.

Vehicle security systems can also include a shutdown device for shutting down the vehicle in the event that it is determined via the AVL that the vehicle has been driven outside of its designated area. This is useful in the event that the vehicle has been misappropriated, either by the employed driver or by a hijacker. The shutdown process can possibly be initiated by the driver, the central dispatch office, the shutdown device itself, or by some combination of these entities.

Essential components of the AVL system are the wireless links that allow the vehicle to communicate with the GPS satellites and with the central dispatch office. Thus, someone who intends to misappropriate the vehicle might attempt to disable the shutdown device of the vehicle security system, which relies on the AVL for its operation, by damaging or removing the antenna of the wireless link.

It is known to provide multiple antennas in a vehicle, or to place the antenna in a hidden location, in order to thwart sabotage. A problem, however, is that hidden or multiple antennas add cost to a vehicle. Another problem is that a well informed hijacker may still be able to damage or remove the antennas no matter how well hidden or numerous the antennas are.

Another known method of countering antenna vandalism by a hijacker involves the shutdown device of the vehicle security system performing periodic "state-of-health" handshaking with the central dispatch office via the wireless link. If the antenna has been damaged such that the shutdown device cannot establish communication with the central dispatch office, then the shutdown device can disable the engine of the vehicle. A problem with this method is that the wireless connection between the shutdown device and the central dispatch office, which is typically over the internet, must be maintained on a nearly continuous basis. Such nearly continuous maintenance of a wireless connection is expensive both monetarily and in terms of bandwidth. Another problem with this method is that there are times when the vehicle's shutdown device will be unable to communicate with the central dispatch office despite the presence of a functional antenna. Reasons for such inability to communicate include signal interference, blockage, and lack of coverage. Thus, the vehicle's shutdown system may be unable to distinguish between a vandalized antenna and an ordinary instance of being temporarily unable to communicate with the central dispatch office.

What is needed in the art is an inexpensive and reliable method of disabling a vehicle in the event of vandalism of the antenna of the vehicle's security system.

SUMMARY OF THE INVENTION

The present invention provides an apparatus and method for sensing damage or removal of the antenna of a vehicle security system and subsequently shutting down the vehicle in the event that the identity of the driver cannot be authenticated.

According to one embodiment of the invention, a vehicle security apparatus for preventing unauthorized use of a vehicle includes an antenna communicating with at least one remote device. Detection circuitry detects damage to and/or removal of the antenna. An operator authentication device determines whether a operator has authorization to operate the vehicle. A shutdown device at least partially disables the vehicle if the detection circuitry detects the damage to and/or removal of the antenna, and if the operator authentication device determines that the operator does not have authorization to operate the vehicle.

According to another embodiment of the present invention, a method of preventing unauthorized use of a vehicle includes providing the vehicle with a wireless communication link. It is detected whether the wireless communication link has been damaged and/or removed. The vehicle is at least partially disabled if it is detected that the wireless communication link has been damaged and/or removed.

According to yet another embodiment of the present invention, a vehicle security apparatus for preventing unauthorized use of a vehicle includes a wireless communication link. Detection circuitry detects damage to and/or removal of the wireless communication link. A shutdown device at least partially disables the vehicle if the detection circuitry detects the damage to and/or removal of the wireless communication link.

An advantage of the present invention is that a would-be hijacker can be reliably thwarted without the added expense of multiple or hidden antennas.

Another advantage is that the vehicle can be disabled without having to maintain a wireless connection with the central dispatch office.

Yet another advantage is that the vehicle security system can distinguish a damaged or missing antenna from a temporary inability to establish a wireless connection due to signal interference, blockage, or lack of coverage.

A further advantage is that an authorized driver may continue to operate the vehicle in the event that the antenna has been inadvertently damaged.

BRIEF DESCRIPTION OF THE DRAWINGS

The present invention will now be described, by way of example, with reference to the accompanying drawings, in which.

Figure 1:
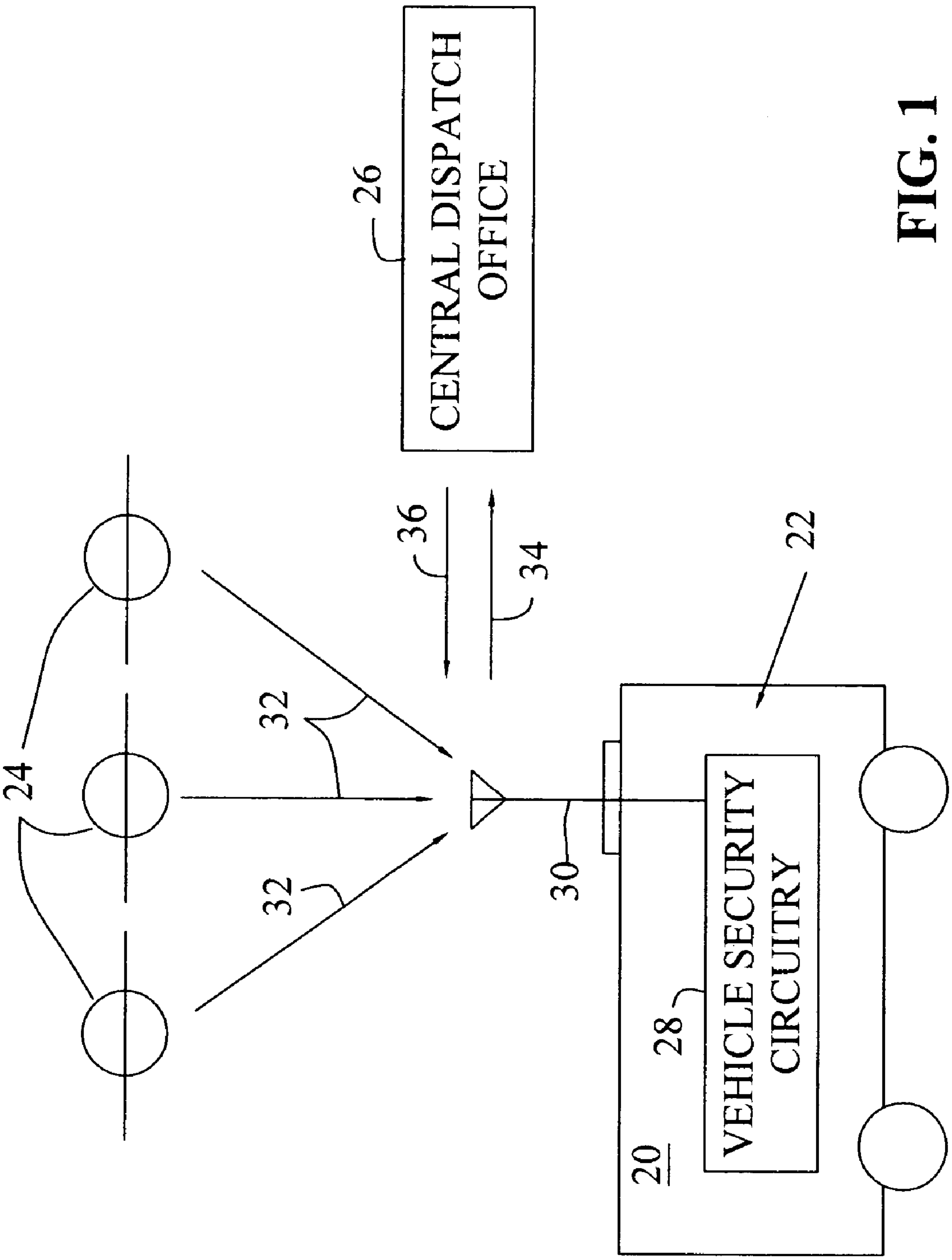
FIG. 1 is a schematic block diagram of a vehicle including one embodiment of a vehicle security apparatus of the present invention in communication with satellites and a central dispatch office.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplifications set out herein illustrate an embodiment of the invention and such exemplifications are not to be construed as limiting the scope of the invention in any manner.

DESCRIPTION OF INVENTION

Referring now to the drawings, and particularly to FIG. 1, there is shown a vehicle 20 including an exemplary embodiment of a vehicle security apparatus 22 of the present invention. The vehicle security apparatus 22 is in communication with remote devices such as global positioning satellites 24 and a vehicle management apparatus in the form of a central dispatch office 26. The vehicle security apparatus 22 includes vehicle security circuitry 28 in electrical communication with a wireless communication link in the form of an antenna 30.

The antenna 30 can receive radio frequency (RF) signals 32 from the satellites 24 and pass the signals to the vehicle security circuitry 28. The circuitry 28 can then use the data from the signals 32 to calculate the global position of the vehicle 20, as is well known in the art. The antenna 30 also transmits RF signals 34 to and receives RF signals 36 from the central dispatch office 26. More particularly, the antenna 30 can transmit RF signals 34 indicating the position of the vehicle 20 as calculated by the circuitry 28. Upon receiving the position signals 34, the office 26 can transmit control signals 36 to the antenna 30 for use by circuitry 28 in controlling the vehicle 20. For instance, upon receiving position signals 34 indicating that the vehicle 20 is outside of its designated area, the office 26 can transmit control signals 36 instructing the circuitry 28 to at least partially disable the vehicle 20 so that it cannot be driven any farther.

Figure 2:
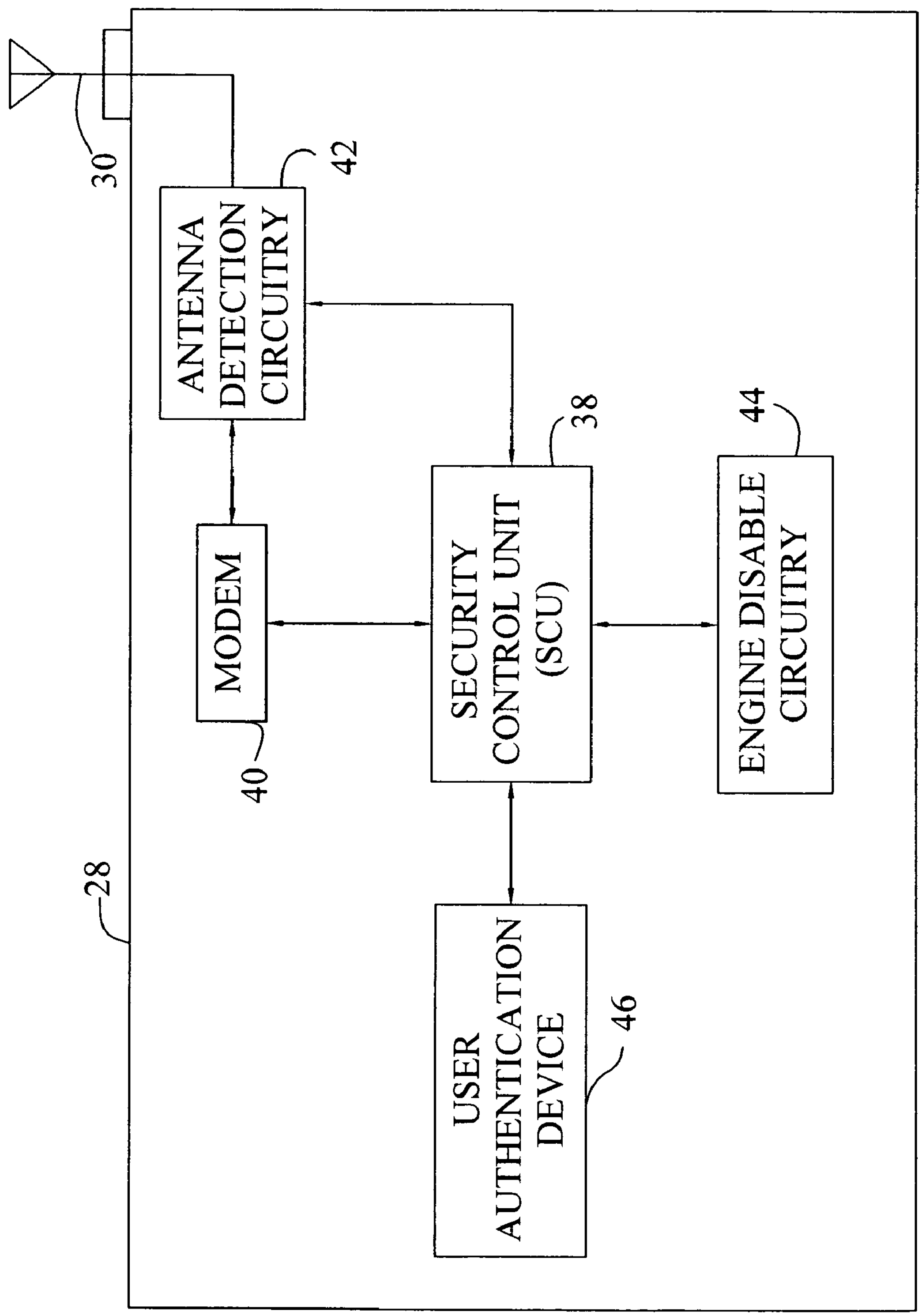
FIG. 2 is a block diagram of the vehicle security apparatus of FIG. 1.

One embodiment of the vehicle security circuitry 28 is shown in more detail in FIG. 2. The vehicle security circuitry 28 includes a security control unit (SCU) 38, a modem 40, antenna detection circuitry 42, a shutdown device in the form of engine disable circuitry 44, and a user/operator authentication device 46.

SCU 38 may include a microprocessor or another type of processor capable of calculating the position of the vehicle 20 in which the SCU 38 is disposed based upon the signals 32 received from the global positioning satellites 24. From the calculated position of the vehicle 20, the SCU 38 can also provide data upon which the outgoing position signals 34 can be based. SCU 38 is also capable of engaging in bidirectional communication and control with each of the antenna detection circuitry 42, the engine disable circuitry 44, and the user authentication device 46, as discussed in more detail below.

The modem 40 can demodulate the incoming RF signals 32 into a form appropriate for processing by the SCU 38. The modem 40 can also modulate an outgoing data signal from the SCU 38 into position signals 34 that are transmitted by the antenna 30.

Both incoming signals from the antenna 30 to the modem 40 and outgoing signals from the modem 40 to the antenna 30 are shown in FIG. 2 as passing through antenna circuitry 42. However, it is to be understood that it is possible within the scope of the invention for signals to pass directly between the modem 40 and the antenna 30 without passing through the antenna detection circuitry 42.

Antenna detection circuitry 42 can detect damage to and/or removal of the antenna 30 from the vehicle 20. It is possible for the antenna detection circuitry 42 to either continuously monitor the antenna 30 for damage or intermittently check the antenna 30 for damage at certain time intervals. Any action that results in sub-optimal performance of the antenna 30 can possibly qualify as damage to the antenna 30 as defined herein.

As discussed above, a hijacker of the vehicle 20 may attempt to disarm the vehicle security apparatus 22 by damaging and/or removing the antenna 30. Once the antenna 30 has been removed, it may be impossible for the vehicle security circuitry 28 to receive RF signals 32 from the satellites 24, transmit position signals 34 to the central dispatch office 26, or receive control signals 36 from the office 26. Further, if not for the benefit of the antenna detection circuitry 42, the SCU 38 may be unable to distinguish whether a lack of incoming signals is due to damage to the antenna 30 or some other temporary reason, such as signal interference, blockage, or lack of coverage.

Upon being informed by the antenna detection circuitry 42 that the antenna 30 has been damaged and/or removed, the SCU 38 may assume foul play. That is, the SCU 38 may assume that the vehicle 20 has been stolen or otherwise misappropriated by either the employed driver or a hijacker. Based upon the assumption of foul play, the SCU 38 can send a signal to the engine disable circuitry 44 that causes the engine disable circuitry 44 to at least partially disable the vehicle 20. For example, the engine disable circuitry 44 can either limit operation of the engine of the vehicle 20 to an idle speed or completely shut down operation of the engine.

Figure 3:
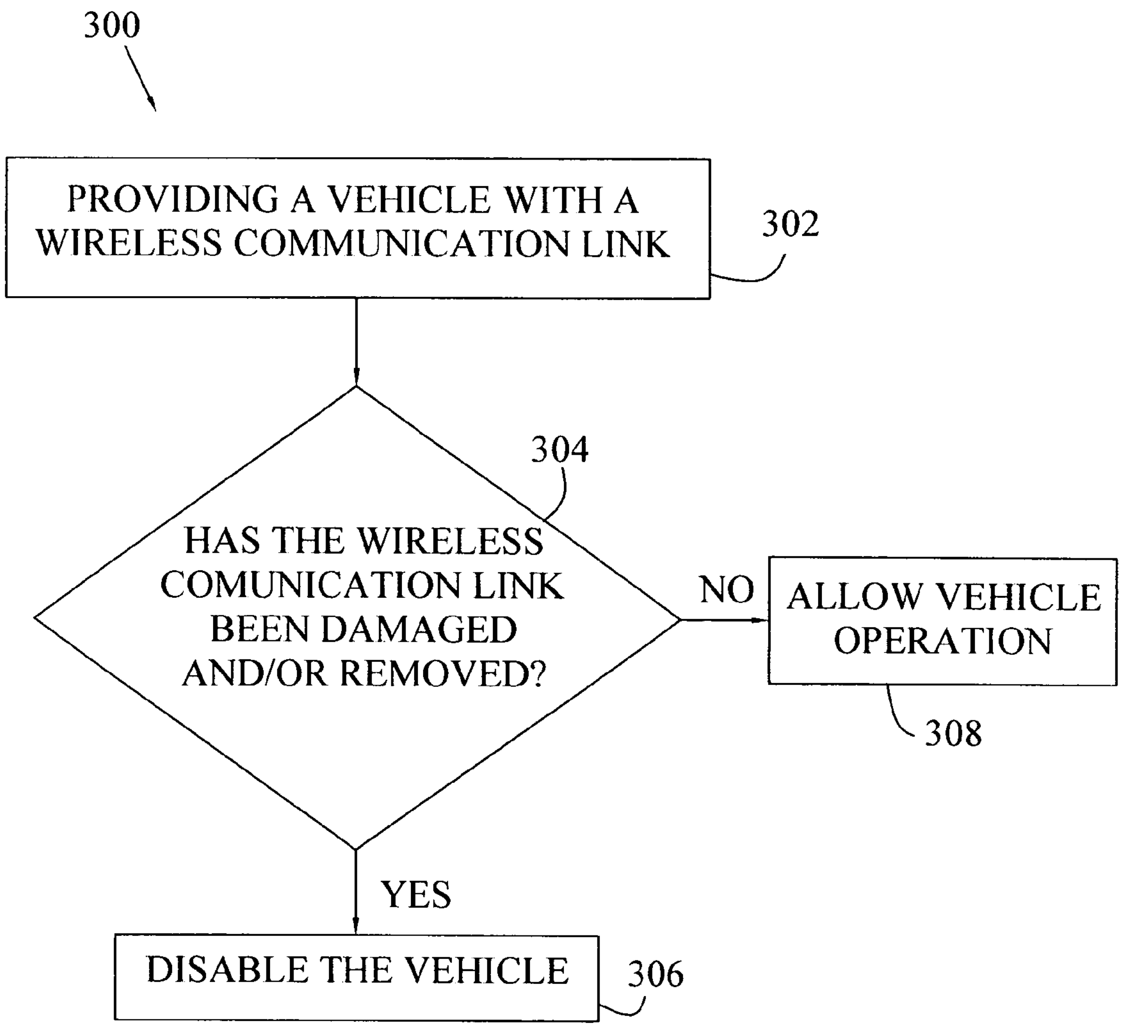
FIG. 3 is a flow chart of one embodiment of a method of preventing unauthorized use of a vehicle according to the present invention.

FIG. 3 is a flowchart illustrating a method 300 which includes steps for preventing unauthorized use of a vehicle 20 in accordance with an exemplary embodiment of the present invention. In step 302, a vehicle 20 with a wireless communication link is provided. For example, the wireless communication link may be embodied by the antenna 30.

In step 304, it is detected whether the wireless communication link has been damaged and/or removed. For example, the antenna circuitry 42 can detect whether the antenna 30 has been damaged and/or removed.

If it is detected in step 304 that the wireless communication link has been damaged and/or removed, then the vehicle 20 is at least partially disabled (step 306). For example, the engine disable circuitry 44 can at least partially disable the vehicle 20.

If, on the other hand, it is detected in step 304 that the wireless communication link has not been damaged and/or removed, then normal operation of the vehicle 20 is allowed (step 308).

In the embodiment depicted in FIG. 3, the vehicle 20 is at least partially disabled whenever the wireless communication link has been damaged and/or removed. It is also possible, however, to allow the vehicle 20 to operate even though the antenna 30 has been damaged if the user authentication device 46 can confirm the identity of the driver. The user authentication device 46 can authenticate the driver by any of various methods such as PIN code entry or fingerprint identification, for example. If the identity of the driver cannot be authenticated, then it is assumed that the vehicle 20 has been hijacked or stolen, and the vehicle 20 is at least partially disabled. It is possible for the user authentication device 46 to authenticate the driver only in the event that the antenna detection circuitry determines that the antenna 30 has been damaged and/or removed.

Figure 4:
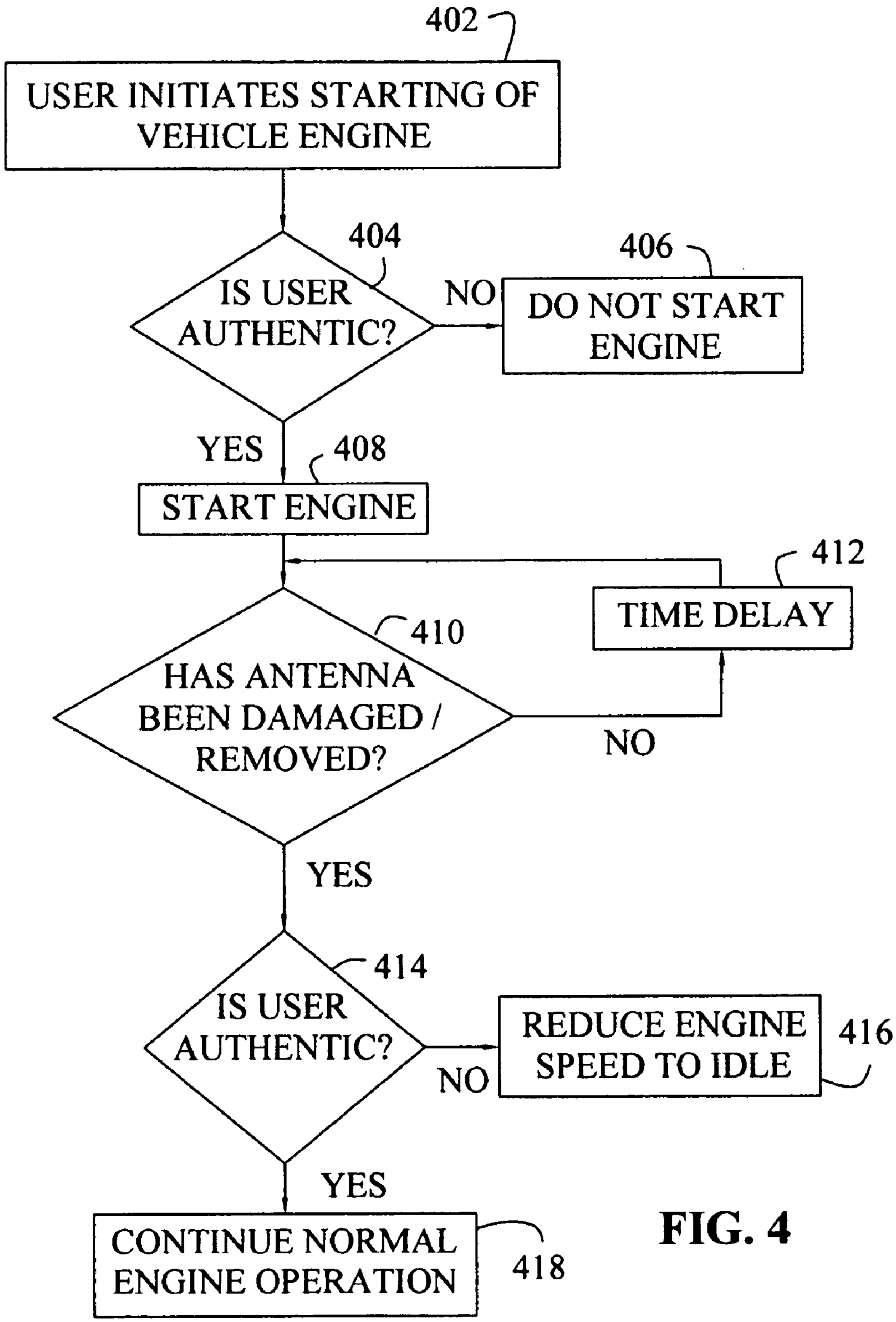
FIG. 4 is a flow chart of another embodiment of a method of preventing unauthorized use of a vehicle according to the present invention.

FIG. 4 is a flowchart illustrating a method 400 which includes steps for preventing unauthorized use of a vehicle 20 in accordance with another exemplary embodiment of the present invention. In step 402, a user/operator initiates starting of the engine of a vehicle. For example, an operator may turn a key in an attempt to start the engine of the vehicle 20. A sensor (not shown) can sense the turning of the key and transmit a signal indicative thereof to the user authentication device 46 or to the SCU 38.

In step 404, the user is authenticated. For instance, the user authentication device 46 can determine whether the operator has authorization to operate the vehicle 20. The user authentication device 46 can initiate the user authentication in response to a signal from the SCU 38 or from the key sensor mentioned above, for example.

If in step 404 the user cannot be determined to be authentic, then the engine of the vehicle is prevented from starting (step 406). For example, if the user authentication device 46 cannot verify the identity of the operator, then the device 46 may send a signal to the engine disable circuitry 44 instructing the circuitry 44 to prevent starting of the engine. The signal may be sent from the device 46 to the circuitry 44 directly or indirectly through the SCU 38. If, however, in step 404 the user is determined to be authentic, then the engine of the vehicle is allowed to start (step 408).

In step 410, it is determined whether the antenna 30 has been damaged and/or removed. For example, the antenna detection circuitry 42 can determine whether the antenna 30 has been damaged and/or removed. If it is determined that the antenna has not been damaged and/or removed, there can be a time delay (step 412) before another check of the antenna is made in step 410. In another embodiment, the status of the antenna can be continuously checked, thereby effectively reducing the time delay in step 412 to zero.

If in any check of the antenna (step 410) it is determined that the antenna 30 has been damaged and/or removed, then it is again determined whether the operator has authorization to operate the vehicle (step 414). That is, if the antenna circuitry determines that the antenna 30 has been damaged and/or removed, then the user authentication device 46 again authenticates the driver. The user authentication device 46 can initiate the user authentication in response to a signal from the SCU 38 or from the antenna detection circuitry 42, for example.

If in step 414 the user cannot be determined to be authentic, then the vehicle is at least partially disabled. For instance, the speed of the engine can be limited to an idle speed (step 416). That is, if the user authentication device 46 cannot verify the identity of the operator, then the device 46 may send a signal to the engine disable circuitry 44 instructing the circuitry 44 to limit the engine to an idle speed. It is also possible for the engine disable circuitry 44 to shut down operation of the engine entirely. The signal may be sent from the device 46 to the circuitry 44 directly or indirectly through the SCU 38. If, however, in step 414 the user is determined to be authentic, then the engine of the vehicle is allowed to continue normal operation (step 418).

Figure 5:
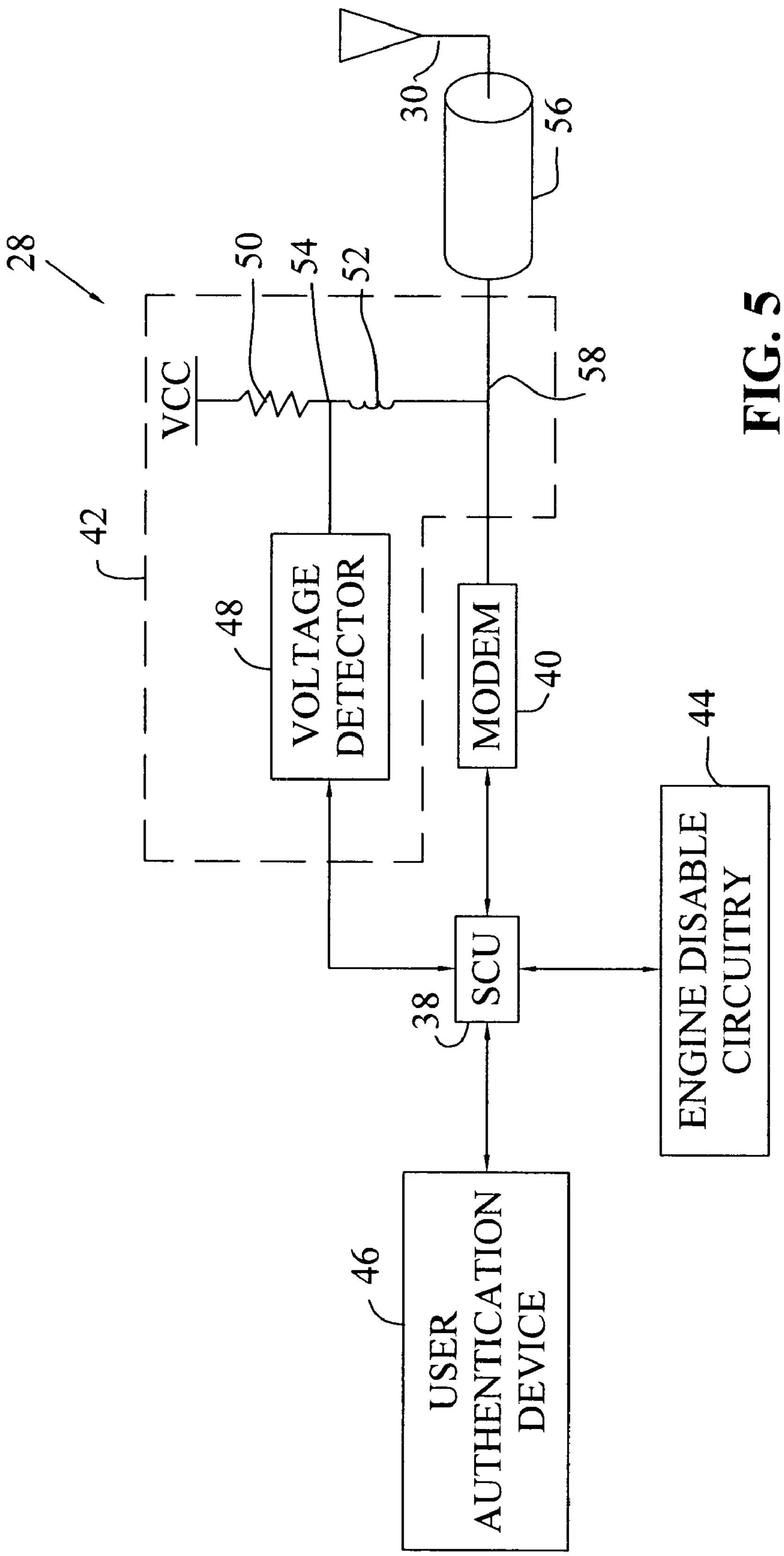
FIG. 5 is a block diagram of the vehicle security apparatus of FIG. 1 including one embodiment of the antenna detection circuitry.
Figure 6:
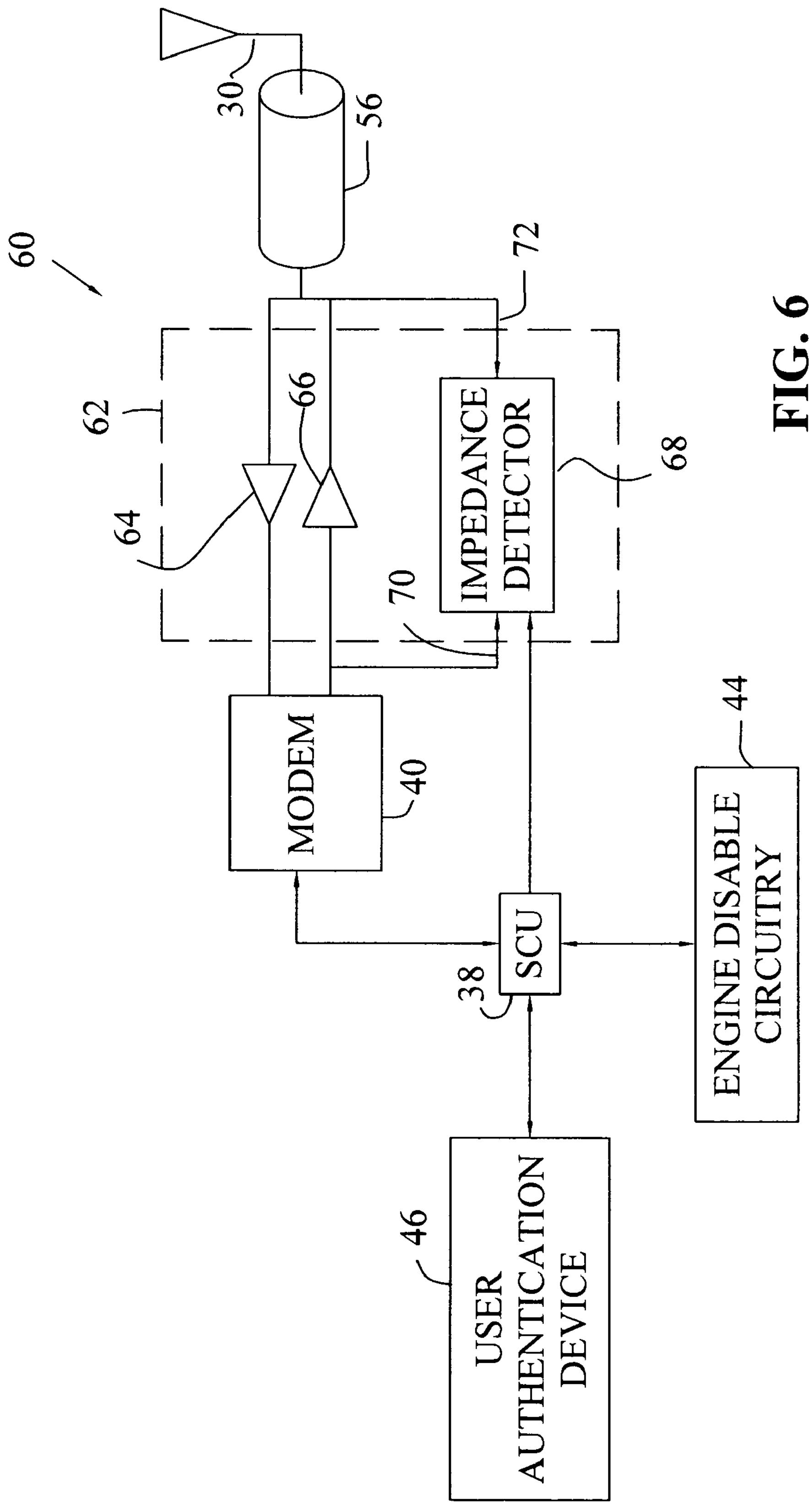
FIG. 6 is a block diagram of the vehicle security apparatus of FIG. 1 including another embodiment of the antenna detection circuitry.
Figure 7:
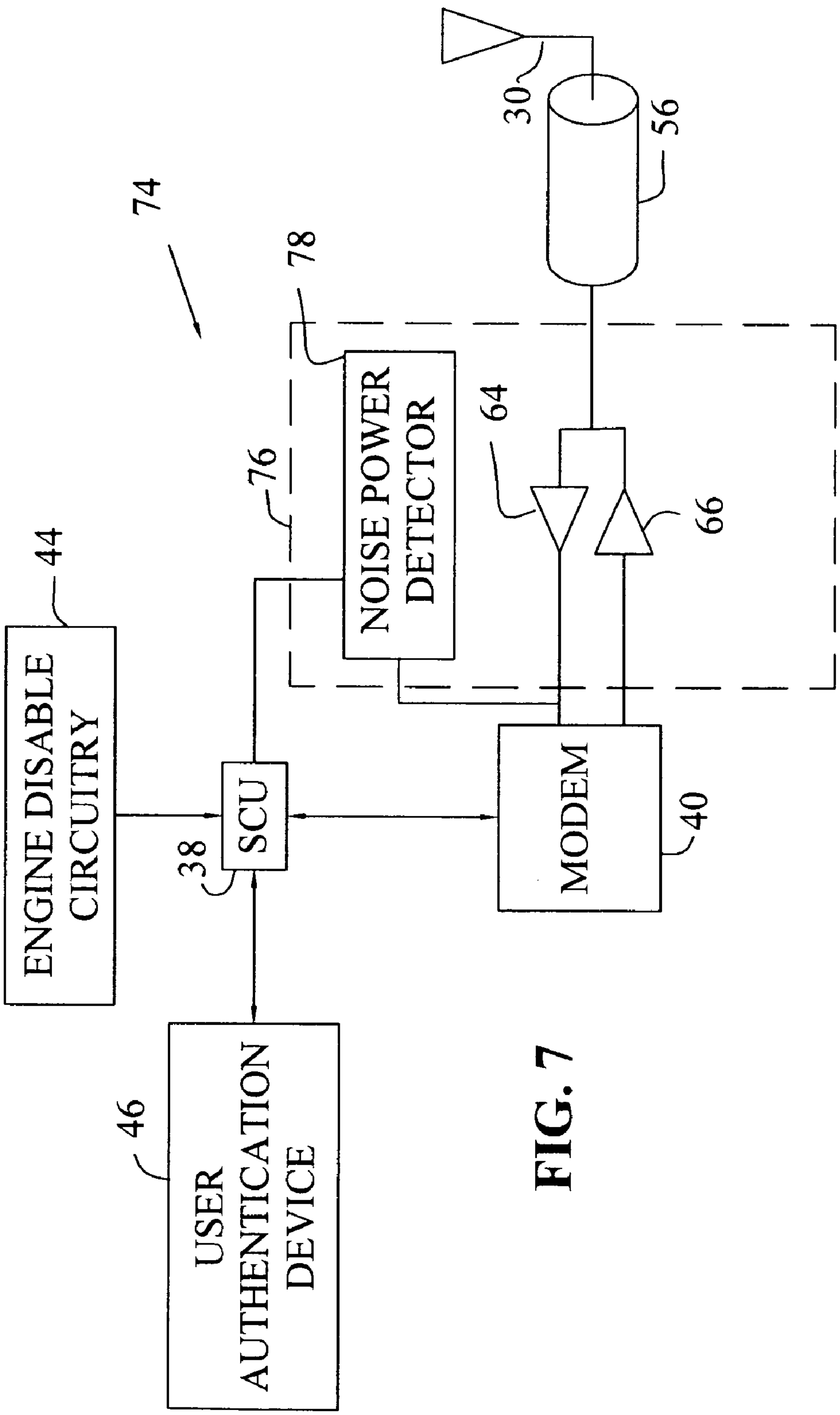
FIG. 7 is a block diagram of the vehicle security apparatus of FIG. 1 including yet another embodiment of the antenna detection circuitry.

Several embodiments of the vehicle security circuitry including different embodiments of the antenna detection circuitry will now be described in conjunction with FIGS. 5–7. In a first of these embodiments (FIG. 5), the antenna detection circuitry 42 includes a voltage detector 48, a resistor 50 and an inductor functioning as a radio frequency choke 52. A VCC voltage such as approximately 5 volts DC is applied to the resistor 50. The voltage detector 48 detects a voltage at a node 54 between the resistor 50 and the choke 52. Thus, the voltage detector 48 is coupled to the antenna 30 through the choke 52.

The antenna 30 is electrically connected to the vehicle security circuitry 28 by a coaxial cable 56. The antenna 30 in the embodiment of FIG. 5 is DC ground by design. That is, the antenna 30 is a DC short. More particularly, the central conductor of the coaxial cable 56 is electrically shorted to ground relative to DC. However, the central conductor of the coaxial cable 56 is not electrically shorted to ground in terms of RF reception, and hence the central conductor is still capable of carrying RF signals. The choke 52 effectively isolates node 54 from the RF signals transmitted between the modem 40 and the antenna 30. Thus, if the antenna 30 is present and undamaged, the voltage detector 48 will detect a zero voltage, i.e., ground, at node 54 due to the antenna 30 being grounded. If, however, the antenna 30 has been removed or damaged such that it is non-functional, a node 58 will be floating rather than grounded. In this case, the voltage detector 48 will measure a voltage of VCC at the node 54. The voltage detector 48 can then send a signal to the SCU 38 indicating damage and/or removal of the antenna 30. In response to this signal, the SCU 38 can, depending upon design requirements, either instruct the engine disable circuitry 44 to at least partially disable the vehicle or instruct the user authentication device 46 to verify the driver's identity.

In a second embodiment, vehicle security circuitry 60 (FIG. 6) includes antenna detection circuitry 62 having a low noise amplifier 64, a power amplifier 66 and an impedance detector 68. The antenna detection circuitry 62 operates on the principle that, if the antenna 30 is functional, an intermediate voltage level and an intermediate impedance can be sensed at the antenna 30 when normal RF signals are being transmitted to the antenna 30 via the power amplifier 66. The impedance of the antenna 30 may have a constant value of approximately 50 ohms, for example, under these conditions. If, however, the antenna 30 has been damaged and/or removed, there will be a voltage standing wave at the coaxial cable 56. That is, the voltage and impedance measured at the cable 56 will oscillate between relatively high peaks and relatively low valleys with a frequency in the radio range. A constant impedance with an intermediate value such as 50 ohms will not be seen if the antenna has been damaged and/or removed. The impedance detector 68 can periodically or randomly check the impedance of the antenna 30. If the impedance is not within some specified range, the impedance detector 68 can indicate to the SCU 38 that the antenna 30 has been removed or damaged.

In order to detect impedance, the detector 68 can measure the output power of the power amplifier 66 through a coupler (not shown) during RF signal transmission by the modem 40. The power amplifier 66 can provide a level of gain that compensates for the loss caused by the coupler. For example, if the coupler has a loss in the range of 10–20 decibels, then the power amplifier 66 can provide a gain in the range of 10–20 decibels. The output power measured by the impedance detector 68 should be within some predetermined range unless the antenna 30 is not functional. The impedance detector 68 can monitor the frequency, voltage and other characteristics of the RF signal from the modem 40 via an input 70. Depending upon the characteristics of the RF signal, the impedance detector 68 may adjust an expected range of the antenna impedance that is measured via an input 72. The LNA 64 functions as a conventional low noise amplifier, amplifying incoming RF signals from the antenna 30. Other aspects of the vehicle security circuitry 60 are substantially similar to the vehicle security circuitry 28 described above.

In a third embodiment, vehicle security circuitry 74 (FIG. 7) includes antenna detection circuitry 76 having low noise amplifier 64, power amplifier 66 and a noise power detector 78. The antenna detection circuitry 76 operates on the principle that a functional antenna 30 will be tuned for, i.e., have a resonance at, a predetermined band of frequencies. Thus, the antenna 30 functions somewhat similarly to a band-pass filter. The noise power detector 78 can continuously, periodically or randomly measure the input noise power at various frequencies during reception. Some of these checked frequencies can be within the frequency band of resonance of the antenna 30, and some of the frequencies can be out of the band. If the antenna 30 is functional, the input noise power should vary between in-band noise received at the antenna 30 and out-of-band noise outside of the antenna resonance. More particularly, the input noise power should be greater at frequencies within the band of the antenna 30. If the input noise power is not greater within the pass band frequencies of the antenna 30, then noise power detector 78 can indicate to the SCU 38 that the antenna 30 has been removed or damaged. The noise power detector 78 can measure the input noise power through a coupler (not shown) or a splitter (not shown) connected to the output of the LNA 64.

Instead of looking for differences in noise power between in-resonance frequencies and out-of-resonance frequencies as described above, it is alternatively possible for a power detector to look for changes in the in-resonance signal power and/or noise power as the vehicle is moving. When the vehicle is moving, the received input signal power and/or input noise power within the resonant frequencies should fluctuate due to changing environments. If the detector 78 does not sense a change in the in-resonance signal power and/or noise power as the vehicle is moving, it may indicate that the antenna 30 is not functional. The detector 78 can then indicate to the SCU 38 that the antenna 30 has been removed or damaged. The technique of monitoring the noise power as the vehicle is moving is particularly applicable to active receive antennas, wherein the noise power is determined by the sky noise. Other aspects of the vehicle security circuitry 74 are substantially similar to the vehicle security circuitries 28 and 60 described above.

The SCU 38 has been described herein as functioning as an intermediary between the antenna detection circuitry 42, the engine disable circuitry 44, and the user authentication device 46. However, it is to be understood that it is within the scope of the invention for any of the antenna detection circuitry 42, the engine disable circuitry 44, and the user authentication device 46 to communicate directly with either of the other two of these elements. That is, signals between the antenna detection circuitry 42, the engine disable circuitry 44, and the user authentication device 46 do not necessarily need to go through the SCU 38.

It is to be further understood that the vehicle security circuitry of the present invention does not necessarily include a user authentication device 46. That is, in the event that the antenna 30 has been damaged and/or removed, the vehicle security circuitry may at least partially disable the vehicle without attempting to verify the driver's identity.

The embodiments disclosed above are not intended to be exhaustive or to limit the invention to the precise forms disclosed in the detailed description. Rather, the embodiments have been chosen and described so that others skilled in the art may utilize their teachings.

Although described in the exemplary embodiments, it will be understood that various modifications may be made to the subject matter without departing from the intended and proper scope of the invention.

What is claimed is:

1. A vehicle security apparatus for preventing unauthorized use of a vehicle, said apparatus comprising:
- an antenna configured to communicate with at least one remote device;
- detection circuitry configured to detect at least one of damage to and removal of said antenna;
- an operator authentication device configured to determine whether a operator has authorization to operate the vehicle, and
- a shutdown device configured to at least partially disable the vehicle if:
  - said detection circuitry detects the at least one of damage to and removal of said antenna; and
  - said operator authentication device determines that the operator does not have authorization to operate the vehicle.

2. The apparatus of claim 1, wherein said operator authentication device is configured to perform said determination of whether a operator has authorization to operate the vehicle only if said detection circuitry detects the at least one of damage to and removal of said antenna.

3. The apparatus of claim 1, wherein said at least one remote device includes at least one of a set of global positioning devices and a vehicle management apparatus.

4. The apparatus of claim 1, wherein said antenna is a DC short, said detection circuitry including a voltage detector coupled to said antenna.

5. The apparatus of claim 1, wherein said antenna is a DC open, said detection circuitry being configured to sense a level of output power associated with said antenna.

6. The apparatus of claim 1, wherein said antenna is a DC open, said detection circuitry being configured to sense a level of input power associated with said antenna.

7. A method of preventing unauthorized use of a vehicle, said method comprising:
- providing the vehicle with a wireless communication link;
- detecting whether said wireless communication link has been at least one of damaged and removed; and
- at least partially disabling the vehicle if it is detected that said wireless communication link has been at least one of damaged and removed.

8. The method of claim 7, comprising the further step of determining whether an operator has authorization to operate the vehicle, said at least partially disabling step occurring only if it is determined that the operator does not have authorization to operate the vehicle.

9. The method of claim 8, wherein said step of determining whether an operator has authorization to operate the vehicle occurs only if it is detected that said wireless communication link has been at least one of damaged and removed.

10. The method of claim 7, comprising the further step of using said wireless communication link to communicate with at least one remote device including at least one of a set of global positioning devices and a vehicle management apparatus.

11. The method of claim 7, wherein said wireless communication link includes a DC shorted antenna, said detecting step including sensing a voltage associated with said antenna.

12. The method of claim 7, wherein said wireless communication link includes a DC open antenna, said detecting step including sensing a level of output power associated with said antenna.

13. The method of claim 7, wherein said wireless communication link includes a DC open antenna, said detecting step including sensing a level of input power associated with said antenna.

14. A vehicle security apparatus for preventing unauthorized use of a vehicle, said apparatus comprising:

a wireless communication link;

detection circuitry configured to detect at least one of damage to and removal of said wireless communication link; and a shutdown device configured to at least partially disable the vehicle if said detection circuitry detects the at least one of damage to and removal of said wireless communication link.

15. The apparatus of claim 14, further comprising an operator authentication device in communication with said shutdown device and configured to determine whether an operator has authorization to operate the vehicle, said shutdown device being configured to at least partially disable the vehicle only if said operator authentication device determines that the operator does not have authorization to operate the vehicle.

16. The apparatus of claim 15, wherein said operator authentication device is configured to perform said determination of whether an operator has authorization to operate the vehicle only if said detection circuitry detects the at least one of damage to and removal of said wireless communication link.

17. The apparatus of claim 14, wherein said wireless communication link is configured to communicate with at least one remote device including at least one of a set of global positioning devices and a vehicle management apparatus.

18. The apparatus of claim 14, wherein said wireless communication link includes an antenna.

19. The apparatus of claim 18, wherein said antenna is a DC short, said detection circuitry including a voltage detector coupled to said antenna.

20. The apparatus of claim 18, wherein said antenna is a DC open, said detection circuitry being configured to sense a level of output power associated with said antenna.

21. The apparatus of claim 18, wherein said antenna is a DC open, said detection circuitry being configured to sense a level of input power associated with said antenna.

* * * * *